Figure 3:
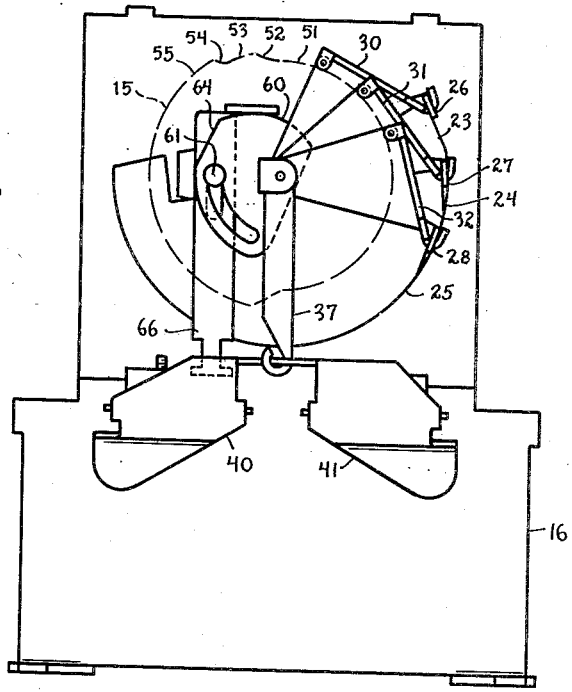

Feb. 22, 1944.    S. CRUM    2,342,390
COMBINATION SWITCH
Filed Feb. 19, 1941    2 Sheets-Sheet 1
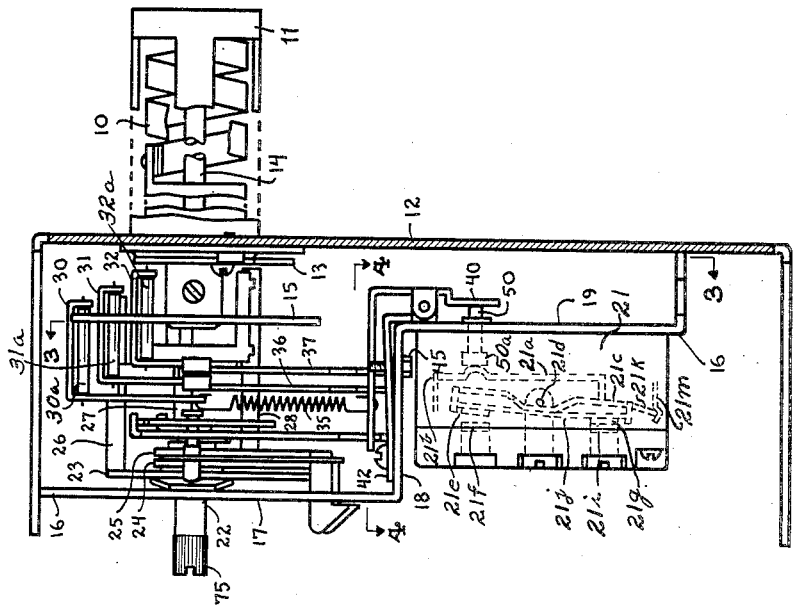
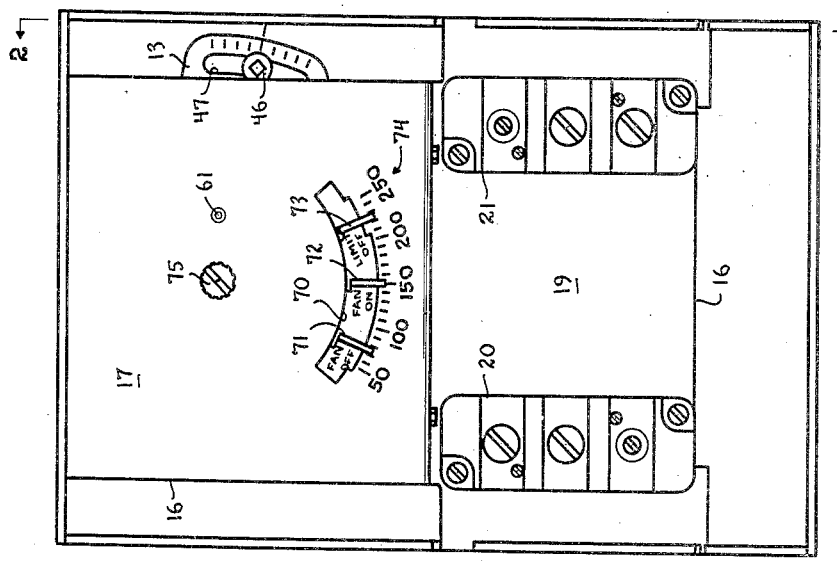
INVENTOR
Stephen Crum
BY George H. Fisher
ATTORNEY Feb. 22, 1944.　　　　　S. CRUM　　　　2,342,390
COMBINATION SWITCH
Filed Feb. 19, 1941　　　　2 Sheets-Sheet 2

INVENTOR
Stephen Crum
BY George H. Fisher
ATTORNEY

Patented Feb. 22, 1944

2,342,390

UNITED STATES PATENT OFFICE 2,342,390

COMBINATION SWITCH

Stephen Crum, Minneapolis, Minn., assignor to Minneapolis-Honeywell Regulator Company, Minneapolis, Minn., a corporation of Delaware Application February 19, 1941, Serial No. 379,564

15 Claims. (Cl. 200—138)

This invention relates to automatic switching mechanisms, and particularly to that class of devices wherein a plurality of switches are sequentialy operated by a single condition-responsive element.

An object of this invention is to provide an improved device of the class described, for example, a combination fan and high limit control actuated by a temperautre responsive device.

Another object of this invention is to provide a linkage between a condition responsive element and a switch including a cam mechanism, whereby overrun of the condition-responsive element will not cause undue strain of either element or switch.

Another object of this invention is to provide a linkage between a condition responsive element and a switch in which the forces act in the same direction during all positions of the device, whereby any lost motion between the parts will not cause a differential in the operation of the device in opposite directions.

Another object of the invention is to construct a combination fan and high limit control having means for separately adjusting the switch closing and switch opening temperatures for the fan controlling switch. A further object is to construct a device of that type in which a snap-action switch having a fixed differential between opening and closing forces is used, and in which the differential between fan switch closing and opening temperatures may be adjusted to a very small value.

A further object of the invention is to provide, in a combination fan and limit switch operated by a thermostatic element responsive to the condition of a heater, an actuator for manually controlling the fan switch in order that the fan may be energized to circulate air for cooling purposes when the heater is not in operation.

A further object is to provide such a manual actuator which will be automatically returned to its normal position when the heater temperature rises, thus returning the fan to control by the thermostat.

Devices such as that herein disclosed have been used to control hot air heating systems having fans to force circulation of heated air. In such a case the actuating thermostat for the fan and high limit switches is placed in the bonnet of the furnace. The high limit switch is wired in series with the main controlling thermostat in the space being heated, so as to shut down the heating system in case the air temperature in the furnace bonnet becomes excessive. The fan switch controls the operation of the fan and is usually set to keep the fan deenergized when the air in the bonnet is cool. As soon as the air becomes warm enough to heat the house, the fan switch closes to start the fan in operation. This normally results in a drop in temperature of the bonnet air with a consequent opening of the fan switch. It is desirable, however, in order to prevent an excessive amount of "hunting" with a consequently excessive number of switch operations, to provide an appreciable differential between the temperature at which the fan starts to operate, and the temperature at which its energizing circuit is opened.

It has been found desirable, in order to provide a device which is readily adaptable to suit the requirements of different heating systems, to make the fan switch closing and opening temperatures readily adjustable. It is also desirable to provide means for adjusting the limit switch opening temperature, but it is not usually necessary to provide means for adjusting the temperature differential between opening and closing of the limit switch.

In manufacturing a device of this type, it has been necessary in the past in order to secure accurate operation, to use very close tolerance in the size of the members in the linkage between the thermostatic element and the switches. This has resulted in a very high cost of production of these devices. The necessity for close tolerances has been materially reduced in the present device by the provision of a linkage such that the forces on each link act in the same direction in all positions of the device. As a result of this construction, there is no lost motion between any two links, even though the fit may be slightly loose.

Figure 5:
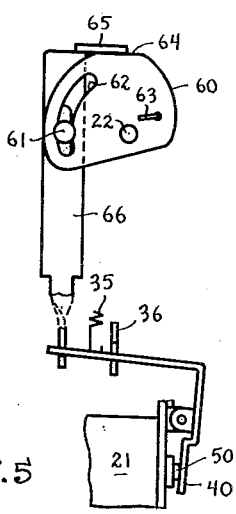
Figure 4:
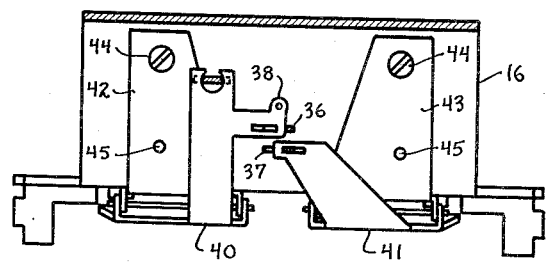

These and other objects and advantages of the present invention will readily become apparent as the following description is read in the light of the accompanying drawings, in which:

Figure 1 is a front elevation of a combined fan and limit switch embodying my invention, Figure 2 is a cross-sectional view taken along the line 2—2 of Figure 1, looking in the direction of the arrows, Figure 3 is a view taken along the line 3—3 in Figure 2, looking in the direction of the arrows, Figure 4 is a view taken along the line 4—4 in Figure 2, looking in the direction of the arrows, and Figure 5 is a detail view of the summer-winter switch operating mechanism, with the bottom part of the figure rotated through ninety degrees.

Referring to the drawings, a helical thermostatic element 10, of conventional type, is shown as surrounded by a shield 11, attached to a housing 12, which is adapted to be mounted on the bonnet of a furnace. One end of the helical thermostatic element 10 is attached to an adjusting plate 13, and the other end is attached to a rod 14 which extends through the back of the casing 12. The plate 13 is fastened to the casing 12 by means of a bolt 46, which passes through an arcuate slot 47 in the plate 13. The inner end of the rod 14 carries a cam 15. Upon a change in the temperature to which the thermostatic element 10 is exposed, the rod 14 is rotated, turning with it the cam 15.

Considering the surface of the cam 15 as shown projected in dotted lines in Figure 3, it will be seen that the cam has a low portion 51, a first rise portion 52, an intermediate dwell portion 53, a second rise portion 54, and a high dwell portion 55. The purpose of these various portions of the cam 15 will be explained later in connection with the operation of the device.

Attached to the casing 12 in any suitable manner, is a bracket plate 16, having an upper vertical portion 17 near the front of the casing 12, an intermediate horizontal portion 18 extending back toward the rear of the casing 12, and a lower vertical portion 19 near the back of the casing 12. Attached to either side of the lower vertical portion 19 of the bracket plate 16 are a pair of switches 20 and 21. These are preferably snap-action switches of the type disclosed in the application of Albert E. Baak, Serial No. 307,991, filed December 7, 1939.

A shaft 22 is mounted centrally of the upper portion 17 of the bracket plate 16, and extends rearwardly therefrom. Freely mounted for rotation about this shaft, are three adjustable plate members 23, 24 and 25. Each of these adjustable plate members carries a rearwardly extending arm, numbered 26, 27 and 28 respectively in the drawings. Each arm pivotally carries a follower plate, numbered respectively 30, 31 and 32, and each plate supports a roller respectively numbered 30a, 31a, and 32a, which are adapted to cooperate with the surface of the cam 15. Each of the follower plates 30, 31 and 32 has a portion in line with the axis of rotation of the shaft 14. Connected to the follower plate 30 at a point substantially in line with the axis of the shaft 14 is a tension spring 35, while connected to the corresponding points on the follower plates 31 and 32 are a pair of links 36 and 37.

The other end of the spring 35 is connected to a projection 38 on a switch actuating lever 40. The link 36 is also connected by any suitable joint to the switch actuating lever 40. The link 37 is connected similarly to another switch actuating lever 41. The switch actuating levers 40 and 41 are pivotally supported on a pair of angular adjusting brackets 42 and 43. These adjusting brackets 42 and 43 are rigidly fastened at one end by means of screws 44 to the horizontal portion 18 of the bracket plate 16. Near the rear end of these adjustable bracket plates are located adjusting bolts 45, by means of which the distance of that portion of the bracket plates from the horizontal portion 18 of the bracket plate 16 may be regulated. The angular bracket plates 42 and 43 have portions extending downwardly in back of the lower vertical portion 19 of the main bracket plate 16. The switch actuating levers 40 and 41 have corresponding downwardly extending portions which are pivotally attached to the downwardly extending portions of the adjusting brackets 42 and 43.

A switch actuating button such as that shown at 50, extends through the back of the vertical portion 19 of the main bracket plate 16 in back of each of the switches 20 and 21. These switch actuating buttons are engaged by the lower end of the switch actuating levers 40 and 41. These switches are biased internally so that the buttons project outwardly from the back of the switches 20 and 21, and the switches are actuated from their normal position only when the switch actuating buttons are pressed inwardly by the switch actuating levers 40 and 41.

The structure of the switch 21 is best shown in Figure 2. The switch 21 has an enlarged portion 50a on the plunger 50 which cooperates with a raised portion of an actuating arm 21a. The arm 21a is of resilient material and is pivoted at 21b. A contact carrying rocker member 21c is pivoted on the central terminal post at 21d and is rocked thereabout by the arm 21a. Contacts 21e and 21g are carried upon a resilient contact blade 21f which is suitably secured to the rocking member 21c. The contacts 21e and 21g cooperate respectively with contacts 21f and 21i mounted on the base of switch 36. A toggle member 21k abuts the lower end of the rocker member 21c and is biased into engagement therewith by a biasing spring 21m. The angle between the points of contact of the member 21k with the spring 21m and the rocker member 21c does not pass over center with respect to the pivot point 21d. With such structure, a spring rate compensation snap action is obtained.

The operation of the switch 21 is as follows: when the button 50 is moved to the left, tension is stored in the resilient member 21a. This tension is resisted by the spring 21m which acts upon the toggle member 21k. This toggle member engages the rocker member 21c at an angle. This angle and the tension in the spring 21m are so selected that they will resist the tension in the resilient member 21a to a predetermined extent. However, when the tension of member 21a overcomes the tension of spring 21m the member 21a begins to move toward the left this resisting force will decrease at a rate more rapid than the decrease of force exerted by the member 21a. Because of this change in force relationship, the contacts will be snap actuated with what is termed a spring rate compensation snap action. In this type of action the tendency of the contacts to move together increases as they approach each other. This function could also be obtained by a magnetic snap action of the self return type in which the contacts are attracted together with a greater magnetic force as the contacts are brought more closely together. It is to be understood that other types of switches having a similar characteristic could also be substituted for the switch 21 without interfering with the operation of the present control device.

As shown best in Figures 3 and 5, there is attached to the inner end of the shaft 22, a cam plate 60 which may be rotated to actuate the switch 21. The shaft 22 is provided with a knurled end 75 so that the cam plate 60 may be rotated from the exterior of the instrument casing. A lug 61, mounted on the upper portion in bracket plate 16, extends through an arcuate slot 62 in the cam plate 60. A spring, the end of which is shown at 63 in Figure 5, biases the cam plate 60 for counter clockwise rotation about the shaft 22, when viewed from a direction as shown in Figure 5. The cam 60 has a flat portion 64 on its periphery which is adapted to be frictionally engaged by a latch member 65. The latch member 65 is attached to the top of a long vertical link 66. The link 66 has a vertical slot therein so that it may be guided by the lug 61. The lower end of the link 66 is attached in any suitable manner to an extension of the switch actuating lever 40.

Each of the adjustable plates 23, 24 and 25 is provided with an indicating finger which extends through arcuate slot 70 in the upper portion 17 of the main bracket plate 16. These indicating extensions are numbered 71, 72 and 73, respectively. A scale, generally indicated at 74, is marked on the front of the main bracket plate 16, to cooperate with these indicating extensions so as to indicate the temperature values at which the switches 20 and 21 will be actuated by the thermostatic element.

Operation

Let it be assumed that the device shown in the drawing is mounted in the bonnet of a furnace so that the thermostatic element 10 is exposed to the temperature within said bonnet. The various parts are shown in the drawings in the positions they would have when the temperature in the furnace bonnet is below that at which either of the switches is actuated. Although the actuating buttons of both switches are in their extended positions, the limit switch, which is the switch 20 in the drawings, is in a position such that the circuit through it is completed, and the operation of the furnace is under the control of the room thermostat, while the fan switch 21 is in a condition such that the circuit through it is not completed and the fan is not in operation.

Now let it be assumed that due to the building of a fire within the furnace the temperature of the furnace bonnet begins to rise, and that followers 30 and 31 have been adjusted so that the distance between them is greater than the length of the dwell portion 53. Such a rise in temperature will cause the cam 15 to be rotated clockwise as viewed in Figure 3. As this clockwise rotation takes place the cam follower attached to the follower plate 30 will reach the rise portion 52 of the cam. As the follower 30 moves up the rise portion 52, it will lift the upper end of the spring 35. The parts are so proportioned that this lifting will be just sufficient to take up the slack in the spring 35 and its connections, and the spring will then be supported in an idle position. As the cam 15 continues to rotate in a clockwise direction, the follower 30 will engage the rise portion 54 and will be further lifted to the high portion 55 of the cam 15. This will cause a tensioning of the spring 35, but the tension will be insufficient to overcome that of the internal spring of the switch 21. If the clockwise rotation of the cam 15 continues further, however, the follower 31 will engage the first rise portion 52 of the cam. As the follower 31 moves up the rise 52, it will transmit a positive actuating force through the link 36 to the switch actuating lever 40. Therefore, the upper end of the lever 40 will be raised and the lower end will be pushed against the switch actuating button 50 to actuate the switch 21 and close the energizing circuit to the furnace fan.

It will be seen that the temperature at which the fan is turned on may be regulated by varying the angular position of the switch follower 31 relative to the cam 15. This may be accomplished by manually moving the indicating portion 72 of the adjusting plate 24. If the instrument is properly calibrated as will be explained later, the position of the indicator 72 on the scale 74 will indicate the temperature at which the fan will be turned on.

As the clockwise rotation of the cam continues the follower 31 will be engaged by the riser portion 54 of the cam and will be lifted to the high portion 55. The switches 20 and 21 are so constructed that they are actuated by the buttons 50 before the buttons reach their inward limit of motion. This additional movement of the follower 31 will therefore cause no strain on the parts, but merely a small additional movement of the lever 40 and the button 50. If it were found necessary or desirable to provide a strain release between the cam and the switch to take care of this additional movement, it could be done simply by providing a flexible member attached at one end to the lever 40, at its other end to the link 36, and biased to pull downwardly on the link 36.

If the bonnet temperature of the furnace still continues to increase the cam 15 will continue to rotate clockwise until the roller of the cam follower 32 engages the rise portion 52 of the cam. As the cam follower 32 moves up the rise portion 52 of the cam, the link 37 will be lifted, carrying with it the switch actuating lever 41. The other end of the lever 41 will press in on the actuating button of the limit switch 20, causing that switch to be opened. In a conventional furnace control system this will cause the furnace to decrease heating regardless of the position of the room thermostat.

The consequent decrease in the heating of the furnace, and hence the bonnet temperature will cause the cam 15 to stop moving clockwise and move in a counterclockwise direction as shown in Figure 3. As the follower 32 moves down the rise portion 52 of the cam, the limit switch is returned to its normal position by the internal spring, thus returning the system to control of the room thermostat.

If the temperature of the furnace bonnet continues to drop, the cam 15 will continue to turn in a counterclockwise direction as viewed in Figure 3, and the cam follower 31 will move down to the low portion of the cam. The tension of the spring 35 is so adjusted, however, that it will hold the switch in its actuated position, even though it is not strong enough to move it there. Therefore, this action of the cam follower 31 will have no effect upon the condition of the switch 21 and the fan circuit will remain energized. When the cam follower 30 starts to move down the rise portion 54, however, the tension of the spring 35 will be decreased so that it is overcome by the internal spring of the switch 21, and the switch will be moved to its open position, de-energizing the fan circuit.

It will be seen therefore that the temperature at which the fan circuit is open may be adjusted by regulating the angular position of the follower 30, and that the temperature at which the limit switch 20 is open may be similarly adjusted by regulating the position of the follower 32. These adjustments are made by moving the indicators 71 and 73 in the same manner as described in connection with the adjustment of the temperature at which the fan is turned on by the indicator 72, above.

The intermediate dwell portion 53 of the cam 15 is made slightly longer than the minimum distance between the followers 30 and 31, to which it is possible to adjust them. When the followers 30 and 31 are set to such a minimum distance, the operation of switch 21 in both directions is controlled by the movement of the followers 31 along the rise portion 52. The dwell portion 53 cooperates at this time with the follower 30 to take up the slack in the linkage of spring 35, and holds the spring in an idle position while the switch is being actuated. With the device adjusted so that the fingers 71 and 72 are as close together as possible the differential between the opening and closing temperature of the fan switch is thus reduced to a minimum value which is limited only by the distance in a radial direction which the cam followers must move in order to move the switch actuating button from one position to the other. The operating differential of this switch is therefore extremely flexible in the present device, being variable from the extremely small value described, to the limits of the scale.

If it is desired to use the fan for cooling in the summer time when the furnace is not working, the fan switch may be turned on by rotating the shaft 22 by means of knurled end 75 so that the cam 60 is rotated in a clockwise direction from the position shown in Figure 3 to the position shown in Figure 5. This will cause the link 66 to be lifted and the latch member 65 will drop to the flat 64 on the cam, to be held by friction set up by lifting lever 35. The upper end of the switch actuating lever 40 will be lifted by the link 66 and the switch will be moved to its on position. The latch 65 will be held in engagement with the cam 60 by the internal spring of the switch 21 acting through the lever 40 and the link 66. The parts will remain in this position as long as desired when they can be returned to the normal position by manually rotating the cam 60 in a counterclockwise direction by means of the knob 75 on the shaft 22. This will force rotation of the cam against friction of the latch 65 on the flat 64 and allow the parts to return to the switch open position, assisted by torsion spring 63.

In case the summer-winter switch is actuated to its summer position, that is, to turn on the fan, and is left in that position when a fire is started in the furnace in the fall, provision is made for returning the fan switch to control of the thermostatic element 10 when the bonnet temperature rises to a value at or slightly above (10° for instance) the fan "on" setting. If, with the parts in the position shown in Figure 5 the bonnet temperature should rise, due to a call for heat it will be apparent that the link 36 would eventually be moved upward by the action of the cam 15 and the follower 31. When this action takes place the tension of the internal spring of switch 21 which is holding the link 66 downwardly will be removed from that link, thus removing the friction set up between flat 64 and latch 65, and allowing the spring 63 to snap the cam 60 in a counterclockwise direction. Upon release of the latch 65 the cam 60 will return to its normal position under the influence of the spring 63 and the fan switch will then be under control of the thermostatic element 10. This assures automatic operation of fan when heating season starts even though the manual switch may have been left on. It thus prevents the fan from blowing cold air through the building when the furnace is not in operation.

The adjusting plate 13 is used to calibrate the device. If, after assembly of the various parts, the scale on the front does not accurately reflect the temperatures of the thermostatic element at which the one of the switches is actuated, the device may be calibrated as to one switch by loosening the bolt 46, and moving the plate 13 about the axis of the shaft 14 so as to change the position of the cam relative to that of the follower, and hence relative to that of the indicator finger associated with that switch. After one of the switches has been satisfactorily calibrated in that manner, the other may be adjusted by turning the bolt 45 associated with the actuating lever 40 or 41 of the switch in question in or out until its operation agrees with that indicated by the scale. The bolts 45 can only change the position of the levers 40 and 41, and hence the radial position of the cam followers at which the switches are actuated. They therefore determine the particular position along one of the cam riser portions at which a switch is actuated. The temperature range of this adjustment is limited by the pitch of the cam risers, but it has been found that this range is sufficient to make up for differences occurring accidentally in the manufacture of the various parts of the device.

It will be seen that in the mechanism described, each link is exposed to forces which act in the same direction in all positions of the device. Taking the link 37 for example, the internal spring of the switch 20 transmits through the lever 41 a force tending to move the lower end of link 37 downward. This force is opposed by the engagement of the follower 32 with the cam 15. Although the position of link 37 may change due to movement of follower 32 by cam 15, these two opposing forces are always present and each always acts in the same direction. The link 37 is therefore always subjected to tensioning forces applied at its two ends, and even though the fit at those ends is loose, there will be no lost motion because of a change in direction of movement of the link. The same is true of all the other links between the thermostatic element and the switch. In this manner, the necessity for close tolerances in the manufacture of the parts is avoided.

By providing the intermediate dwell portion 53, the minimum differential possible with a given switch is secured without the necessity for close tolerances or accurate fitting of the parts. If the dwell portion were not provided, the minimum differential would depend on the position of both followers 30 and 31 along the rise portion, which would have to be accurately shaped so as to secure the greatest possible pitch consistent with the minimum differential. Furthermore, the followers and connecting links would have to be made just as accurately, as a small difference in the length of one of the links would make a considerable difference in the minimum differential obtained.

It should also be noted that by having the followers connected to an operating link which is substantially in line with the axis of the cam, the force applied by each follower to the cam surface is substantially radial. There is thus very little force applied to the cam riser portions by the followers in a direction which would oppose motion of the cam when lifting the follower, and aid motion of the cam when lowering the follower.

Various changes and modifications of this invention will doubtless occur to those who are skilled in the art and for this reason I wish it to be understood that I am to be limited only by the scope of the appended claims and not by the specific embodiments disclosed herein.

I claim as my invention:

1. A device of the class described comprising in combination, a switch, a member rotatable about an axis in response to a variable condition, a cam fixed on said member for rotation therewith, a casing for supporting said member and said switch, a follower for said cam having an arm extending over the end of said axis, and link means connected to said arm at a point substantially in alignment with said axis and to said switch.

2. A device of the class described comprising in combination, a switch, a member rotatable about an axis in response to a variable condition, a cam fixed on said member for rotation therewith, a casing for supporting said member and said switch, a member adjustably mounted on said casing for manual rotation about a point substantially in alignment with said axis, a follower for said cam pivotally mounted on said member, a connection between said follower and said switch, and biasing means associated with said switch and acting through said connection to hold said follower in engagement with said cam.

3. A device of the class described, comprising in combination, a member movable in response to a variable condition, a cam operated upon movement of said member, a switch movable between two positions, said switch having biasing means acting to hold said switch in its first position with a force of predetermined value, and when in its second position tending to move said switch to its first position with a force of smaller predetermined value, a second biasing means operable to oppose said first biasing means with a force intermediate said predetermined values, actuating means for said switch, a first follower for said cam connected to said actuating means through said second biasing means, and a second follower for said cam directly connected to said actuating means.

4. A device of the class described, comprising in combination, a member movable in response to a variable condition, a cam operated upon movement of said member and having a rise portion, a switch movable between two positions, said switch having biasing means acting to hold said switch in its first position with a force of predetermined value, and when in its second position tending to move said switch to its first position with a force of smaller predetermined value, a second biasing means operable to oppose said first biasing means with a force intermediate said predetermined values, actuating means for said switch, a first follower for said cam connected to said actuating means through said second biasing means, and a second follower for said cam directly connected to said actuating means, said first follower operating said second biasing means upon engagement with said rise portion, thereby predisposing said switch for operation to said second position upon engagement of said second follower by said rise portion, said switch being operated back to said first position upon movement of said first follower down said rise portion.

5. A device of the class described, comprising in combination, a member movable in response to a variable condition, a cam operated upon movement of said member and having two rise portions and an intermediate dwell portion, a switch movable between two positions, said switch having biasing means acting to hold said switch in its first position with a force of predetermined value, and when in its second position tending to move said switch to its first position with a force of smaller predetermined value, a second biasing means operable to opposite said first biasing means with a force intermediate said predetermined values, actuating means for said switch, a first follower for said cam connected to said actuating means through said second biasing means, and a second follower for said cam directly connected to said actuating means, a casing for supporting said member and said switch, and a pair of members adjustably mounted on said casing, each of said adjustable members supporting one of said followers.

6. A device of the class described, comprising in combination, a plurality of switches, a member rotatable about an axis in response to a variable condition, a cam fixed on said member for rotation therewith, a plurality of followers for said cam, each follower having an arm extending over the end of said axis, and link means connecting a point in alignment with said axis on each of said arms with one of said switches.

7. In a heating system having a warm air furnace and a fan for forcing circulation of air, a fan control comprising, in combination, a thermostatic element adapted to be mounted in the bonnet of said furnace, a switch controlling an energizing circuit for said fan, a connection between said element and said switch for operating said switch to circuit closing position when the temperature in said bonnet is above a predetermined value, manual means for operating said switch, latch means for holding said switch in its circuit closing position, and means including said connection for releasing said latch means whenever the bonnet temperature rises above said predetermined value.

8. In a heating system having a warm air furnace and a fan for forcing circulation of air, a fan control comprising, in combination, a thermostatic element adapted to be mounted in the bonnet of said furnace, a switch controlling an energizing circuit for said fan, a connection between said element and said switch for operating said switch to circuit closing position when the temperature in said bonnet is above a predetermined value, means biasing said switch to open position, manual means for operating said switch, second biasing means tending to hold said manual means in a normal position corresponding to open position of the switch, latch means associated with said manual means for releasably holding said switch in circuit closing position, said first mentioned biasing means serving to hold said latch means in engagement with said manual means, and means including said connection for overcoming said first biasing means and thereby releasing said latch means whenever the bonnet temperature rises above said predetermined value.

9. A device of the class described comprising in combination, a switch operable between a first position and a second position, a member rotatable about an axis in response to a variable condition, a cam fixed on said member for rotation therewith, a casing for supporting said member and said switch, a follower for said cam having an arm extending over the end of said axis, link means connected to said arm at a point substantially in line with said axis and to said switch, means biasing said switch to said first position, a manually movable member for operating said switch to said second position, second biasing means opposing such operation of said manually movable member, latch means associated with said manually movable member for holding said switch in said second position, said first mentioned biasing means serving to hold said latch means in engagement with said manually movable member, said second biasing means returning said manually movable means to its normal position when said first mentioned biasing means is overcome by movement of said switch to said second position by said condition responsive member.

10. In combination, a member rotatable about an axis in accordance with a variable condition, a switch operable between a first position and a second position, a first transmitting member movable by said rotatable member, a second transmitting member operatively connected to said switch, said transmitting members being attached to each other at a point substantially in line with said axis, means biasing said switch to said first position, a manually movable member for operating said switch to said second position, second biasing means opposing such operation of said manually movable member, latch means associated with said manually movable member for holding said switch in said second position, said first mentioned biasing means serving to hold said latch means in engagement with said manually movable member, said second biasing means returning said manually movable means to its normal position when said first mentioned biasing means is overcome by movement of said switch to said second position by said condition responsive member.

11. In a device of the class described, in combination, a switch, a member rotatable about an axis in response to a variable condition, eccentric means fixed on said member for rotation therewith, and switch actuating means cooperable with said eccentric means comprising a lever having an adjustable fulcrum, a portion spaced from said fulcrum movable by said eccentric means toward and away from said axis, a second portion spaced from said fulcrum substantially aligned with said axis and movable laterally with respect thereto, and connecting means between second portion and said switch.

12. In a device of the class described including a control means, a first member rotatable about an axis in response to a variable condition, eccentric means fixed on said first member for rotation therewith, a second member for operating said control means and cooperating with said eccentric means, a fulcrum for said second member, a first portion of said second member spaced from said fulcrum and movable by said eccentric means toward and away from said axis; the second member comprising a second portion spaced from said fulcrum and substantially aligned with said axis and movable with respect thereto, and connecting means between said second portion and said switch whereby any stress applied by said second member on said eccentric is substantially radial.

13. A device of the class described, comprising in combination, a plurality of switches, a member rotatable about an axis in response to a variable condition, a cam fixed on said member for rotation therewith, a plurality of followers for said cam, means for manually adjusting the position of each follower circumferentially with respect to said cam, each follower having a portion extending over the end of said axis, and link means connecting a point in alignment with said axis on each of said portions with one of said switches.

14. A device of the class described, comprising in combination, a member movable in response to a variable condition, a cam operated upon movement of said member and having two rise portions and an intermediate dwell portion, a switch movable between two positions, said switch having biasing means acting to hold said switch in its first position with a force of predetermined value, and when in its second position tending to move said switch to its first position with a force of smaller predetermined value, a second biasing means operable to oppose said first biasing means with a force intermediate said predetermined values, actuating means for said switch, a first follower for said cam connected to said actuating means through said second biasing means, a second follower for said cam directly connected to said actuating means, and a casing for supporting said member and said switch.

15. A device of the class described, comprising in combination, a member movable in response to a variable condition, a cam operated upon movement of said member having a first and a second rise portion and an intermediate dwell portion, a switch movable between two positions having a biasing means, a second switch movable between two positions, actuating means for the first switch, actuating means for the second switch, a first follower means for said cam having biasing connecting means to the actuating means for the first switch, a second follower means for said cam connected to the first switch actuating means, a third follower means connected to the actuating means for the second switch, said first follower operating said second biasing means upon engagement with the said two rise portions thereby predisposing said first switch for operation to said second position upon engagement of said second follower by said first rise portion, a third follower operating the second switch to its second position upon engagement with the first rise portion on the cam, said second switch being operated back to its first position upon movement of said third follower down the first rise portion, and said first switch is operated back to its first position upon movement of said first follower down the second mentioned rise portion.

STEPHEN CRUM.